United States Patent [19]

Koepke et al.

[11] Patent Number: 4,883,601
[45] Date of Patent: Nov. 28, 1989

[54] PROCESS FOR PURIFYING AN AQUEOUS, HYDROGEN SULFIDE-SCRUBBING SOLUTION

[75] Inventors: Jeffery W. Koepke, Orange; Dennis D. Delaney, Yorba Linda, both of Calif.

[73] Assignee: Union Oil Company of California, Los Angeles, Calif.

[21] Appl. No.: 238,752

[22] Filed: Aug. 30, 1988

[51] Int. Cl.⁴ .......................... C01G 31/00; C02F 1/72
[52] U.S. Cl. ..................... 210/710; 210/713; 210/722; 210/765; 210/909; 210/912; 423/55; 423/67; 423/221; 423/226; 423/573.1
[58] Field of Search ........ 210/710, 713, 717, 719–722, 210/724, 726, 752, 757, 758, 759, 763, 765, 904, 908, 909, 912–914, 919; 423/55–57, 65, 66, 67, 68, 127, 131, 140, 147, 150, 221, 226, 573 R, 573 G; 502/25

[56] References Cited

U.S. PATENT DOCUMENTS

| | | | |
|---|---|---|---|
| 3,956,460 | 5/1976 | Brocoff .............................. | 423/221 |
| 3,959,452 | 5/1976 | Espenscheid et al. .......... | 423/226 X |
| 4,060,594 | 11/1977 | Fenton et al. .................. | 423/226 X |
| 4,118,467 | 10/1978 | Sano et al. ...................... | 423/226 X |
| 4,360,508 | 11/1982 | Farrington et al. ............ | 423/226 X |
| 4,364,918 | 12/1982 | Espenscheid ................... | 423/226 X |
| 4,367,212 | 1/1983 | Castrantas ...................... | 423/226 X |
| 4,385,044 | 5/1983 | Wolcott .......................... | 423/226 X |
| 4,451,439 | 5/1984 | Maurel et al. .................. | 423/55 |
| 4,495,157 | 1/1985 | Sebenik et al. ................. | 423/55 X |
| 4,544,533 | 10/1985 | Marcantonio .................. | 423/67 |
| 4,666,685 | 5/1987 | Wiewiorowski ................ | 423/66 X |
| 4,670,229 | 6/1987 | Wiewiorowski et al. ...... | 423/55 |

OTHER PUBLICATIONS

E. Wiewiorowski, R. Tinnin, R. Crnojevich, "A Cyclic Process for Recovery of Metals from Spent Catalysts," *Society of Mining Engineers*, Preprint No. 88–168, Jan. 25–28, 1988, pp. 1–9.

A. L. Kohl, F. C. Riesenfeld, "Liquid Phase Oxidation Processes for Hydrogen Sulfide Removal," *Gas Purification*, Fourth Edition, Gulf Publishing Company, 1985, pp. 521–539.

J. T. Tallon, R. W. Rittmeyer, E. D. Maruhnich, "Analysis of Options for Management of Spent Stretford Solution," Work performed for the U.S. Department of Energy under Contract No. DE-AC21-82MC19392, DOE/MC19392-1721, Jun. 1984, pp. 1–94.

*Primary Examiner*—Tom Wyse
*Attorney, Agent, or Firm*—Yale S. Finkle; Gregory F. Wirzbicki

[57] ABSTRACT

A process for purifying an aqueous, hydrogen sulfide-scrubbing solution which contains a water-soluble transition metal component, such as a vanadium component or an iron component, in addition to at least one water-soluble organic compound, such as an aromatic sulfonate or an alkanolamine, in which the scrubbing solution is mixed with particles of a spent solid catalyst containing molybdenum and aluminum and a basic aqueous solution, preferably a solution comprising sodium aluminate, to form a slurry which is subsequently contacted with an oxygen-containing gas under conditions such that the molybdenum in the catalyst is solubilized. Thereafter, molybdenum is precipitated from the solution along with the water-soluble transition metal component and a wastewater substantially free of the transition metal component and the organic compound originally present in the scrubbing solution is recovered.

40 Claims, 1 Drawing Sheet

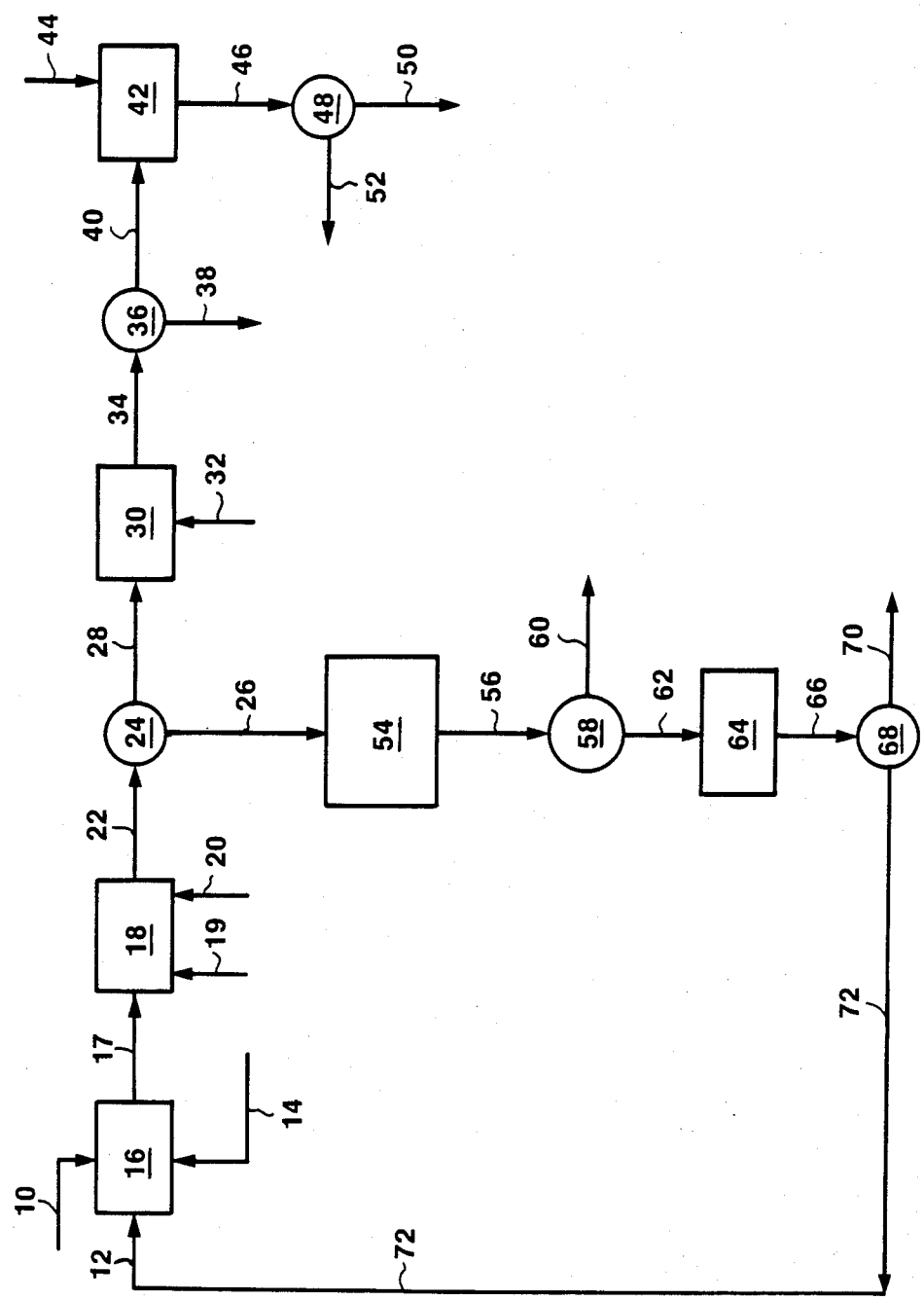

PROCESS FOR PURIFYING AN AQUEOUS, HYDROGEN SULFIDE-SCRUBBING SOLUTION

BACKGROUND OF THE INVENTION

This invention relates to the purification of aqueous hydrogen sulfide-scrubbing or washing solutions and is particularly concerned with processes for treating such solutions so that they can be safely and legally discharged into the environment.

One area of particular concern in the oil and chemical industries is the release of sulfur and its compounds into the atmosphere as the result of the refining of petroleum, the sweetening of sour and natural gas, the processing of ores, the destructive distillation of coal and/or oil shale, the gasification or liquefaction of coal, the use of geothermal fluids to generate electricity or other processes which produce hydrogen sulfide-containing gases.

Various processes have been employed to remove hydrogen sulfide from gas streams. These processes include, among others, the Stretford process, the Takahax process and the Unisulf process. All three of these processes employ aqueous alkaline scrubbing or washing solutions to absorb the hydrogen sulfide from the gas stream and to convert the absorbed hydrogen sulfide primarily to elemental sulfur. The spent solution is regenerated by flowing air through the solution. The product sulfur is separated from the regenerated solution before recycling the solution to the absorber. The scrubbing solution employed in the Stretford process contains a water-soluble salt of anthraquinone disulfonic acid (ADA) and a water-soluble vanadate. The washing solution employed in the Takahax process contains a water-soluble naphthoquinone sulfonate alone or in combination with a multivalent metal compound. The Unisulf scrubbing solution, like the Stretford scrubbing solution, contains a water-soluble vanadate and a water-soluble salt of ADA or other aromatic sulfonate, such as a water-soluble salt of phenolsulfonic acid. In addition, the Unisulf solution also contains thiocyanate ions and a carboxylate complexing agent such as citric acid.

While the above-discussed processes and other hydrogen sulfide-scrubbing processes have been successful in substantially reducing the hydrogen sulfide content of the gas streams being treated, there are problems associated with the processes. One common problem involves the undesirable conversion of the absorbed hydrogen sulfide and/or the product sulfur to water-soluble sulfur-containing salts such as sulfates and thiosulfates which accumulate in the washing solution. These accumulated salts tend to (1) increase the corrosivity of the scrubbing solution, (2) cause precipitation of the desired constituents of the scrubbing solution and (3) increase the rate of chemical consumption of the alkaline constituents of the scrubbing solution. Because of this, Stretford solutions must be replaced about every six to eighteen months while Unisulf solutions may need replacement every five or more years. Traditionally, the spent scrubbing solutions are disposed of by sending them to toxic waste landfills. Disposal in this manner is not only expensive, costing between one and two million dollars per year for the disposal of spent Stretford solutions by a typical refinery, but also raises certain risks.

These risks include the fact that the Environmental Protection Agency (EPA) has started to force the cleanup of such landfills under the Comprehensive Environmental Response Compensation Liability Act (CERCLA or Superfund) and the Superfund Amendment and Reauthorization Act of 1986 (SARA). In addition, the Hazardous and Solid Waste Amendments (HSWA) to the Resource Conservation and Recovery Act (RCRA) forbid disposal of certain substances in toxic waste landfills. This list of substances is likely to grow as regulations become stricter. Finally, the EPA is especially strict on disposal of liquids in toxic waste landfills because of the high probability that a liquid will enter the water table. In view of the legislative activity in this area, there is a high probability that the disposal of aqueous hydrogen sulfide-scrubbing solutions in toxic waste landfills may not be legal in the future.

Because of the costs and risks of disposing of spent, aqueous, hydrogen sulfide-scrubbing solutions in toxic waste landfills, there is a need for alternative means of disposal. Accordingly, it is a primary object of the present invention to provide a process for treating such solutions to purify them so that the resultant wastewater can be safely discharged into the environment. It is another object of the invention to provide such a process that can be used in conjunction with existing commercial processes so that the cost of disposal is substantially reduced. These and other objects of the invention will become more apparent in view of the following description of the invention.

SUMMARY OF THE INVENTION

In accordance with the invention, it has now been found that aqueous hydrogen sulfide-scrubbing solutions which contain a water-soluble transition metal component, such as a vanadium component or an iron component, in addition to at least one water-soluble organic compound, such as an aromatic sulfonate or an alkanolamine, can be purified in conjunction with a process for reclaiming metals, such as molybdenum, nickel, cobalt and the like, from spent alumina-based catalysts by processing the aqueous scrubbing solution with the spent catalyst. The preferred metals recovery process for use in the process of the invention is known as the AMAX Port Nickel process. This process is described in detail in Preprint No. 88-168 of the Society of Mining Engineers entitled "A Cyclic Process for Recovery of Metals from Spent Catalysts" dated Jan. 25-28, 1988 and in U.S. Pat. Nos. 4,495,157, 4,666,685 and 4,670,229, the disclosures of which preprint and patents are hereby incorporated by reference in their entireties. Although any hydrogen sulfide-scrubbing solutions containing a water-soluble transition metal component and a water-soluble organic compound can be used in the process of the invention, a preferred scrubbing solution for treatment in the process of the invention is a Stretford solution which contains water-soluble sodium vanadate and the sodium salt of anthraquinone disulfonic acid. Stretford solutions processed in accordance with the invention normally also contain sodium bicarbonate, sodium carbonate, sodium sulfate, sodium thiosulfate and elemental sulfur.

In accordance with the process of the invention, the aqueous, hydrogen sulfide-scrubbing solution is mixed with (1) particles of a spent solid catalyst containing molybdenum, aluminum and, optionally, other metals such as nickel, cobalt, vanadium and the like, and (2) a basic aqueous solution, preferably a solution of sodium aluminate and/or sodium hydroxide. The resultant slurry is contacted with an oxygen-containing gas under conditions such that substantially all of the molybdenum in the catalyst is dissolved and oxidized to molybdate while the aluminum remains substantially in the form of a solid residue. The aqueous solution formed in this oxidation step is then separated from the solid residue and contacted with hydrogen sulfide under conditions such that the molybdenum in the solution is precipitated. The resultant aqueous solution substantially free of molybdenum is contacted with a base under conditions such that any vanadium or other transition metal component in the solution, whether originating from the hydrogen sulfide-scrubbing solution or the spent catalyst, is precipitated. Finally, a wastewater substantially free of transition metal components and any organic compounds originally present in the hydrogen sulfide-scrubbing solution is recovered and can be legally discharged into the environment without causing pollution problems.

The embodiment of the invention described above, by utilizing proven techniques for reclaiming metals from alumina-based spent catalysts to simultaneously purify aqueous hydrogen sulfide-scrubbing solutions, is very cost effective. Instead of disposing of the aqueous hydrogen sulfide-scrubbing solutions in toxic waste landfills at relatively high costs and with the risk that one or more federal or state environmental laws may be violated, this embodiment of the invention allows such potentially hazardous solutions to be disposed of at lower costs in existing processing plants by converting the solution to an environmentally acceptable waste stream.

BRIEF DESCRIPTION OF THE DRAWING

The drawing is a schematic flow diagram of a process for purifying aqueous hydrogen sulfide-scrubbing solutions carried out in accordance with the invention.

DETAILED DESCRIPTION OF THE INVENTION

In accordance with the process of the invention depicted in the drawing, the aqueous hydrogen sulfide-scrubbing or washing solution to be disposed of is passed through line 14 into slurry vessel 16 where it is mixed with finely divided particles of a spent alumina-based catalyst from which metals are to be reclaimed and a basic aqueous solution to form a basic slurry. The catalyst and basic aqueous solution are introduced into vessel 16 through lines 10 and 12, respectively.

The spent catalyst used in forming the slurry may originate from any of a number of catalytic operations, primarily operations carried out in the petroleum industry. These operations include hydrotreating, hydrocracking, hydrodesulfurization, hydrodemetallization and the like. Normally, the catalyst will comprise alumina as a support material on which hydrogenation metals such as molybdenum, nickel, tungsten and cobalt have been deposited. Since the catalysts will typically have been used to upgrade petroleum streams, they may also contain vanadium, nickel and/or sulfur which may have been present as contaminants in the petroleum streams processed. The catalysts may also contain carbonaceous material deposited during the processing operations and silica as part of the base on which the metals and contaminants are deposited. Typically, the catalyst is ground to a particle size less than about 50 mesh on the U.S. Sieve Series Scale, usually less than about 150 mesh, before being mixed with the hydrogen sulfide-scrubbing solution and aqueous base to form the slurry.

The hydrogen sulfide-scrubbing solutions which can be purified in accordance with the invention are solutions capable of both absorbing hydrogen sulfide and also converting it to elemental sulfur. Such solutions normally contain a water-soluble transition metal component which has at least two stable oxidation states, such as a vanadium component or an iron component, in addition to at least one water-soluble organic compound, both of which must be removed during purification. Also, such solutions typically contain thiosulfate. Examples of hydrogen sulfide-scrubbing solutions that can be used in the process include Sulfolin solutions, Stretford solutions, Unisulf solutions, Takahax solutions and Hiperion solutions. All of these solutions except for Hiperion solutions contain vanadium in the form of vanadate ions while Hiperion solutions contain iron components. The organic compound in Sulfolin solutions is an alkanolamine, typically diethanolamine, while Hiperion solutions normally contain either 1,4-naphthoquinone or 1,3-naphthoquinone-2-sulfonate. Stretford solutions, Unisulf solutions and Takahax solutions all contain aromatic sulfonates. Stretford solutions contain sodium anthraquinone disulfonate while Takahax solutions preferably contain 1,4-naphthoquinone-2-sulfonate. The aromatic sulfonate present in a Unisulf solution is usually sodium anthraquinone disulfonate or sodium phenolsulfonate.

Stretford solutions and their use to convert hydrogen sulfide to elemental sulfur are described in detail in U.S. Pat. No. 4,367,212 and in Chapter 9 of the book entitled *Gas Purification* by Arthur L. Kohl and Fred C. Risenfeld, fourth edition, published by the Gulf Publishing Company in 1985. The disclosures of both the patent and the book are hereby incorporated by reference in their entireties. Sulfolin solutions and Hiperion solutions are described in detail, respectively, in U.S. Pat. Nos. 4,537,752 and 4,255,400, the disclosures of which patents are also hereby incorporated by reference in their entireties. The Takahax process and solutions are discussed in Chapter 9 of the book on gas purification by Kohl and Risenfeld. Stretford solutions, Unisulf solutions, Sulfolin solutions, Takahax solutions and Hiperion solutions will normally contain thiosulfate ions in addition to a transition metal component and at least one organic compound. Like the metal component and the organic compound, the thiosulfate ions will be substantially removed in the process of the invention.

The basic aqueous solution used to form the slurry in vessel 16 can be a solution of any basic compound that, when mixed with the spent catalyst and hydrogen sulfide-scrubbing solution, will yield a basic slurry. The cation present in the basic solution is not generally critical and is normally selected to match the cation present in the aqueous hydrogen sulfide-scrubbing solution. For example, if the scrubbing solution is a Stretford or Unisulf solution, which typically contain sodium cations, the cations present in the basic aqueous solution will also be sodium cations. Of course, the cation used must be environmentally acceptable in the form in which it will exist in the effluent water from the process.

The anion present in the basic aqueous solution, like the cation, must be one that will pass through the process without leaving undesirable components in the wastewater of the process. Examples of such anions include carbonate, hydroxide and aluminate. Thus, when treating a hydrogen sulfide-scrubbing solution containing sodium cations, the basic aqueous solution is normally a solution of sodium carbonate, sodium hydroxide, sodium aluminate or mixtures thereof. As is made clear hereinafter, a preferred basic aqueous solution is a solution containing sodium aluminate or a mixture of sodium aluminate and sodium hydroxide.

After the slurry of hydrogen sulfide-scrubbing solution, spent catalyst and basic aqueous solution is formed in vessel 16, it is passed through line 17 to high pressure oxidation vessel 18 where it is subjected to a high pressure, high temperature leaching in the presence of an oxygen-containing gas, preferably air, introduced into the vessel through line 20.

Additional amounts of the hydrogen sulfide-scrubbing solution to be purified in accordance with the process may be introduced into vessel 18 via line 19. Normally, the amount of scrubbing solution introduced into vessels 16 and 18, and the amount of basic aqueous solution and catalyst introduced into slurry vessel 16 is such that the slurry in vessel 18 contains a hydroxide ion equivalent of between about 5 and 40 grams per liter and a solids concentration that ranges between about 50 and about 200 grams per liter.

The oxidation and leaching step which takes place in vessel 18 is normally carried out in an autoclave at a temperature between about 300° F. and 500° F. and at a total pressure between about 125 p.s.i.g. and about 750 p.s.i.g., preferably between about 150 p.s.i.g. and about 400 p.s.i.g. Normally, the amount of oxygen present in oxidation vessel 18 is sufficient to provide a partial pressure of oxygen between about 25 p.s.i.g. and about 150 p.s.i.g. The residence time of the slurry in oxidation vessel 18 is typically between about 30 minutes and about 2 hours, preferably between about 80 minutes and about 100 minutes.

The pressurized oxidation and leaching in vessel 18 is normally carried out under conditions such that molybdenum and/or vanadium on the spent catalyst is converted to watersoluble molybdates and vanadates, sulfur in the scrubbing solution or in the catalyst is oxidized to sulfate, oil and/or carbon on the catalyst and organic compounds in the scrubbing solution are converted into carbon dioxide and water, and thiosulfate present in the scrubbing solution is oxidized to sulfate. Normally, little if any of the aluminum and other metals such as nickel and cobalt in the spent catalyst are solubilized in this oxidation and leaching step. The pH of the slurry in vessel 18 constantly changes during the oxidation and leaching step. Typically, the oxidation and leaching is carried out so that the slurry discharged from vessel 18 has a pH between about 7.0 and 9.0.

After the oxidation and leaching step is completed, the slurry is withdrawn from the high pressure oxidation vessel 18 through line 22 and passed to centrifuge, filter or other liquid-solids separation device 24 where the aqueous solution formed in oxidation vessel 18 is separated from the solids, which contain primarily aluminum and undissolved metals such as nickel and cobalt that may have originally been present in the spent catalyst fed to slurry vessel 16. The solids are removed from liquid-solids separation device 24 through line 26 and processed to recover aluminum and other metal values as described in more detail hereinafter.

The aqueous solution recovered in separation device 24 will normally contain soluble molybdate in the form of sodium molybdate, soluble vanadate in the form of sodium vanadate, and soluble sulfate in the form of sodium sulfate. This solution may also contain small amounts of the watersoluble organic compounds originally present in the hydrogen sulfide-scrubbing solution which were not oxidized in oxidation vessel 18. The aqueous solution is removed from separation device 24 through line 28 and passed to molybdenum precipitation vessel 30 wherein the solution is contacted with hydrogen sulfide gas introduced into the vessel through line 32 under conditions such that the soluble molybdenum in the aqueous solution is precipitated in the form of molybdenum sulfide. Normally, the pH in vessel 30 is maintained at a value less than about 1.0 so that the desired precipitation will take place. The pH of the solution introduced into the vessel through line 28 is usually in the range between about 7.0 and 9.0 and is adjusted downward by adding an acid such as sulfuric acid. The temperature in vessel 30 during the molybdenum precipitation step is typically maintained between about 150° F. and about 200° F. Any iron present in the solution fed to vessel 30, which iron may originate on either the spent catalyst originally charged to slurry vessel 16 or as water-soluble iron present in the hydrogen sulfide-scrubbing solution used to form the slurry in vessel 16, will be precipitated as iron sulfide. The molybdenum precipitation step which takes place in vessel 30 is discussed in detail in U.S. Pat. No. 4,495,157.

The aqueous solution and precipitated solids formed in vessel 30 are passed through line 34 to filter, centrifuge or other liquid-solids separation device 36 wherein the precipitate is removed from the solution and passed downstream through line 38 for further processing to recover molybdenum, usually in the form of molybdenum sulfide. The aqueous solution from separation device 36, which still contains soluble sulfate and vanadium components, is passed through line 40 into vanadium precipitation vessel 42. Here, the vanadium, which is normally in solution as the vanadyl cation, $VO^{+2}$, is precipitated, usually in the form of the hydrated oxide, by neutralizing the solution with a base introduced into vessel 42 via line 44. Any base which will increase the pH of the solution to a value in the range between about 2.0 and about 7.0 may be used. Examples of such bases include sodium carbonate and sodium hydroxide. Under some circumstances it may be desirable to treat the aqueous solution with sodium perchlorate, $NaClO_4$, prior to adjusting the pH by adding the base. Normally, the vanadium precipitation step will be carried out in vessel 42 at a temperature between about 50° F. and about 100° F. The vanadium precipitation step, like the molybdenum precipitation step is described in more detail in U.S. Pat. No. 4,495,157.

The slurry effluent from vessel 42 is passed through line 46 to filter, centrifuge or similar liquid-solids separation device 48 wherein the vanadium-containing precipitate formed in vessel 42 is separated from the slurry, thereby leaving a molybdenum and vanadium-free solution. The vanadium-containing precipitate is removed from separation device 48 through line 50 and passed downstream for further processing to recover a pure vanadium pentoxide product.

The molybdenum and vanadium-free aqueous solution removed through line 52 from liquid-solids separator 48 is normally a purified wastewater containing primarily soluble sulfate and carbonate typically in the form of sodium sulfate and sodium carbonate and can be safely discharged into the environment. The solution will contain little if any vanadium components, molybdenum components, elemental sulfur, thiosulfate or water-soluble organic constituents. Typically, the wastewater stream will contain less than about 10 ppmw of each of these constituents, preferably less than about 5.0 ppmw, most preferably less than 1.0 ppmw. When a Stretford solution is treated in accordance with the process, the concentration of anthraquinone disulfonate, calculated as anthraquinone disulfonic acid, in the wastewater withdrawn from the process through line 52 will normally be less than about 10 ppmw, usually in the range between about 0 and about 5.0 ppmw. When the spent catalyst introduced into slurry vessel 16 contains high levels of oil and other organic material, it may be desirable to further treat the wastewater in line 52 prior to discharge into the environment by adding a small amount of chlorine to the stream.

The wastewater stream in line 52 is typically substantially free of any nickel or cobalt (less than 10 ppmw, preferably less than 1.0 ppmw of each) that may have originally been present in the spent catalyst introduced into slurry vessel 16 through line 10 because these metals are not solubilized in oxidation vessel 18 and remain with the alumina-containing solids withdrawn from liquid-solids separator 24 through line 26. These solids are primarily composed of alumina with the nickel and cobalt, if present, forming a minor proportion of the solids. These solids can be treated to recover a portion of the alumina and any nickel or cobalt as described in U.S. Pat. No. 4,670,229. In accordance with this process, the solids in line 26 are passed to digester 54 where they are mixed with sodium hydroxide in sufficient concentrations to dissolve the alumina as sodium aluminate. Normally, the pH of the sodium hydroxide solution will be above about 14. The digestion of alumina usually takes place at a temperature in the range between about 300° F. and 400° F., preferably in a closed vessel adapted to withstand pressure.

The effluent from digestion vessel 54 is passed through line 56 to filter, centrifuge or other liquid-solids separation device 58 wherein the sodium aluminate-containing solution is separated from the nickel and cobalt-containing solid residue. This residue is removed from the separator via line 60 and passed downstream for further processing to recover nickel and cobalt constituents. The alumina-containing solution is withdrawn through line 62 and passed to alumina precipitation vessel 64 wherein aluminum oxide is crystallized on aluminum hydroxide seed material. The resultant mixture is then passed through line 66 to filter, centrifuge or similar liquid-solids separation device 68 where the alumina crystals are recovered from the solution and passed through line 70 to product purification. The sodium hydroxide-sodium aluminate solution recovered in separation device 68 is then recycled through lines 72 and 12 to slurry vessel 16 wherein it serves as the basic aqueous solution used to form the slurry.

It will be apparent from the foregoing that the invention provides a process which makes it possible to treat hydrogen sulfide-scrubbing solutions cocurrently with a spent catalyst to essentially convert the scrubbing solution into a wastewater stream which can be legally disposed of by discharge into the environment. The process is based, at least in part, upon the surprising discovery that water-soluble organic compounds commonly found in hydrogen sulfide-scrubbing solutions, e.g., alkanolamines and salts of anthraquinone disulfonic acid and other aromatic sulfonates, in concentrations that typically range between about 0.5 grams per liter and about 75 grams per liter are substantially completely removed from the solution along with any transition metal components, e.g., vanadium components and the like. It is believed that substantially all of the water-soluble organic compounds are oxidized in the high pressure oxidation and leaching step.

The preferred hydrogen sulfide-scrubbing solution for use in the process of the invention is a Stretford solution. As pointed out previously, a Stretford solution typically contains water-soluble sodium vanadate and sodium anthraquinone disulfonate in addition to sodium bicarbonate, sodium carbonate, sodium sulfate, sodium thiosulfate and elemental sulfur. It is normally desirable to dispose of Stretford solutions when the sodium sulfate and sodium thiosulfate concentrations become so large that the Stretford solution becomes corrosive and inefficient in absorbing and converting hydrogen sulfide to sulfur. This normally occurs when the concentrations of sodium thiosulfate, calculated as the pentahydrate, and sodium sulfate, calculated as anhydrous, fall, respectively, in ranges between about 180 and about 500 grams per liter, and between about 60 and about 150 grams per liter. Usually, Stretford solutions become corrosive and inefficient when the concentration of the former approaches 250 grams per liter while the concentration of the latter nears about 80 grams per liter. Once the Stretford solution becomes corrosive and inefficient, the concentration of the other components in the solution will normally be in the ranges shown in Table 1 below:

TABLE 1

| Component | Concentration Range gm/l |
|---|---|
| sodium carbonate equivalent | 8–20 |
| vanadium | 1.5–8.0 |
| anthraquinone disulfonic acid | 10–50 |
| elemental sulfur | 0.5–4.0 |

It has been surprisingly discovered that, when spent Stretford solutions as described above are subjected to the process of the invention, substantially all of the vanadium, which is in the form of sodium vanadate, and anthraquinone disulfonic acid, which is also in the form of its sodium salt, is removed from the solution along with elemental sulfur and sodium thiosulfate. Normally, a sufficient amount of the Stretford solution or other hydrogen sulfide-scrubbing solution is introduced into vessel 16 through line 14 and into vessel 18 through line 19 so that it comprises between about 1.0 and about 50 weight percent, preferably between about 1.0 and about 20 weight percent, and most preferably between about 1.0 and 10 weight percent, of the slurry in vessel 18.

Another hydrogen sulfide-scrubbing solution which can be used in the process of the invention is known as a Unisulf solution and is described in detail in U.S. Pat. Nos. 4,325,936, 4,432,962 and 4,283,379, the disclosures of which patents are hereby incorporated by reference in their entireties. A Unisulf solution typically differs from a Stretford solution in that it contains sodium thiocyanate, typically in concentrations between about 40 grams per liter and about 100 grams per liter, and sodium citrate, usually in concentrations between about 15 and 30 grams per liter, in addition to sodium vanadate, sodium bicarbonate, sodium carbonate, sodium sulfate, sodium thiosulfate and elemental sulfur. Also, instead of sodium anthraquinone disulfonate, a Unisulf solution may contain other types of aromatic sulfonates such as the sodium salt of phenolsulfonic acid.

When a Unisulf solution is subjected to the process of the invention, the sodium citrate is normally converted in high pressure oxidation and leaching vessel 18 to carbon dioxide and water and will appear in the wastewater effluent withdrawn from the process through line 52 in amounts less than about 10 ppmw, preferably less than 5.0 ppmw and most preferably less than 1.0 ppmw. In some cases the oxidation step which takes place in vessel 18 can be carried out at severe enough conditions that the sodium thiocyanate present in the solution is also oxidized. In cases where this is not possible, an additional sodium thiocyanate oxidation step is usually added to the process of the invention. Such an additional step is preferably carried out after the high pressure oxidation and leaching which takes place in vessel 18 so that thiosulfate is not present to react with the thiocyanate oxidizing agent.

The thiocyanate oxidation step can be carried out in the process of the invention before the molybdenum precipitation in vessel 30, before the vanadium precipitation in vessel 42 or after the separation in liquid-solids separator 48. The oxidation is normally carried out by treating the aqueous solution existing at the desired point in the process, i.e., the aqueous solution in lines 28, 40 or 52, with an oxidizing agent for thiocyanate ions. Examples of such oxidizing agents include hydrogen peroxide, Caro's acid, nitrous acid, nitric acid, ozone, and ferric ions. If hydrogen peroxide is used and a pH of between 4 and 12 is maintained during treatment of the desired stream, the thiocyanate will be converted to sulfate, cyanogen, ammonia and carbonate and will appear in the wastewater effluent from the process in concentrations of less than 10 ppmw, typically less than 5.0 ppmw and usually less than 1.0 ppmw.

Sulfolin hydrogen sulfide-scrubbing solutions, like Unisulf solutions, contain thiocyanate ions and may also require the use of an extra oxidation step, as is typically required in processing Unisulf solutions, in order to obtain an environmentally acceptable wastewater. Sulfolin solutions, unlike Unisulf and Stretford solutions, do not contain an aromatic sulfonate. Instead they contain an alkanolamine such as diethanolamine which will normally be converted into carbon dioxide, ammonia and water in high pressure oxidation and leaching vessel 18.

Other hydrogen sulfide-scrubbing solutions which can be treated in accordance with the process of the invention include Hiperion solutions and Takahax solutions. Both of these types of solutions contain a water-soluble naphthoquinone as the organic component. A Hiperion solution differs from a Takahax solution in that it contains an iron constituent instead of a vanadium constituent. The iron constituent is removed in the process of the invention along with molybdenum in the molybdenum precipitation vessel 30 wherein the iron constituent reacts with hydrogen sulfide to form iron sulfide. Like the aromatic sulfonates used in the Stretford and Unisulf solutions, the naphthoquinone in the Takahax and Hiperion solutions is removed in either the high pressure oxidation or leaching step which takes place in vessel 18 or as entrained material in the molybdenum precipitation step which takes place in vessel 30 and/or the vanadium precipitation step which occurs in vessel 42.

In the embodiment of the invention described above and shown in the drawing, hydrogen sulfide-scrubbing solutions which contain a water-soluble transition metal component and a water-soluble organic compound are purified in conjunction with the treatment of a spent alumina-based catalyst for reclamation of metal values. It will be understood that the process of the invention is not limited to the presence of the spent catalyst but also encompasses the treatment of the hydrogen sulfide-scrubbing solution in the absence of such a catalyst. In this latter embodiment of the invention, slurry vessel 16 in the drawing is eliminated along with the spent catalyst introduced through line 10 and the basic aqueous solution introduced through line 12. The hydrogen sulfide-scrubbing solution itself is passed directly into high pressure oxidation vessel 18 where it is contacted with air or other oxygen-containing gas introduced into vessel 18 through line 20 and subjected to temperature and pressure conditions such that substantially all of the water-soluble organic compound is oxidized. The effluent from vessel 18 will not contain any solids since a spent catalyst was not present in vessel 18 with the hydrogen sulfide-scrubbing solution. Thus, liquid-solids separation devices 24, 36, 58 and 68, digestion vessel 54 and alumina precipitation vessel 64 are not required. The oxidized hydrogen sulfide-scrubbing solution exiting vessel 18 is passed directly to vessel 30 which, in this embodiment of the invention, serves as a vessel in which the oxidized scrubbing solution is contacted with a reducing agent, such as hydrogen sulfide or hydrogen, introduced into the vessel through line 32 under conditions such that substantially all of the water-soluble transition metal component is reduced. The effluent from vessel 30 is then passed directly to vessel 42 where it is mixed with a base introduced through line 44 under conditions such that the vanadium or other water-soluble transition metal component in the solution is precipitated. The slurry effluent from vessel 42 is then passed to liquid-solids separation device 48 where the precipitate is separated from the slurry, thereby leaving in line 52 a purified wastewater substantially free of the water-soluble organic compound and transition metal component originally present in the hydrogen sulfide-scrubbing solution.

In some cases, such as when the hydrogen sulfide-scrubbing solution contains an iron component, the reduction step which takes place in vessel 30 may not be required. In such cases, the effluent from vessel 18 is passed directly to vessel 42 for precipitation of the transition metal component. On the other hand, when an iron component is present in the scrubbing solution and the reducing agent is hydrogen sulfide, iron will be precipitated in the reduction step and the subsequent treatment with base in vessel 42 is not required. Also, when treating hydrogen sulfide-scrubbing solutions which contain thiocyanate, it may be necessary to use a thiocyanate oxidation step as discussed with respect to the embodiment of the invention in which the spent catalyst is processed with the hydrogen sulfide-scrubbing solution.

Although this invention has been primarily described by reference to embodiments thereof, it is evident that many alternatives, modifications and variations will be apparent to those skilled in the art in light of the foregoing description. Accordingly, it is intended to embrace within the invention all such alternatives, modifications and variations that fall within the spirit and scope of the appended claims.

We claim:

1. A process for purifying an aqueous hydrogen sulfide-scrubbing solution containing a water-soluble vanadium component and a water-soluble organic compound, said scrubbing solution being capable of absorbing hydrogen sulfide and converting the hydrogen sulfide into elemental sulfur, which process comprises:

(a) forming a slurry by mixing said scrubbing solution with (1) particles of a spent solid catalyst containing molybdenum and aluminum and (2) a basic aqueous solution;

(b) contacting said slurry with an oxygen-containing gas under conditions such that the molybdenum in said catalyst is dissolved and oxidized to molybdate while said aluminum remains substantially in the form of a solid residue;

(c) separating said aqueous solution formed in step (b) from said solid residue;

(d) contacting said aqueous solution with hydrogen sulfide under conditions such that the molybdenum in said solution is precipitated, thereby forming an aqueous solution having a reduced concentration of molybdenum;

(e) contacting said aqueous solution having a reduced concentration of molybdenum with a base under conditions such that the vanadium in said solution is precipitated, thereby forming an aqueous solution having a reduced concentration of vanadium and molybdenum; and (f) recovering said aqueous solution having a reduced concentration of vanadium and molybdenum as wastewater which also has a reduced concentration with respect to said slurry formed in step (a) of said water-soluble organic compound originally present in said hydrogen sulfide-scrubbing solution.

2. A process as defined by claim 1 wherein said hydrogen sulfide-containing solution comprises a Takahax solution in which said water-soluble organic compound is a naphthoquinone.

3. A process as defined by claim 1 wherein said water-soluble organic compound is an aromatic sulfonate.

4. A process as defined by claim 3 wherein said aromatic sulfonate is sodium anthraquinone disulfonate.

5. A process as defined by claim 1 wherein said basic aqueous solution used in step (a) comprises sodium aluminate.

6. A process as defined by claim 1 wherein said basic aqueous solution utilized in step (a) comprises a mixture of sodium aluminate and sodium hydroxide.

7. A process as defined by claim 1 wherein said oxygen-containing gas comprises air.

8. A process as defined by claim 1 wherein step (b) is carried at a pressure between about 150 p.s.i.g. and about 400 p.s.i.g. and at a temperature between about 300° F. and about 500° F.

9. A process as defined by claim 1 wherein said hydrogen sulfide-scrubbing solution also contains thiocyanate ions and said process further comprises the step of oxidizing said thiocyanate ions with a thiocyanate oxidizing agent following step (c) of said process.

10. A process as defined by claim 1 wherein said hydrogen sulfide-scrubbing solution comprises a Stretford solution in which said water-soluble vanadium component is sodium vanadate, said water-soluble organic compound is sodium anthraquinone disulfonate, said Stretford solution further comprises sodium thiosulfate and elemental sulfur, and said wastewater recovered in step (f) has a reduced concentration with respect to said slurry formed in step (a) of vanadium, molybdenum, sodium anthraquinone disulfonate, sodium thiosulfate and elemental sulfur.

11. A process as defined by claim 1 wherein said aqueous solution is contacted with said hydrogen sulfide in the presence of added sulfuric acid.

12. A process as defined by claim 1 wherein the individual concentrations of vanadium, molybdenum and said water-soluble organic compound in said wastewater recovered in step (f) are less than about 10 ppmw.

13. A process as defined in claim 12 wherein said wastewater recovered in step (f) is substantially free of vanadium, molybdenum and said water-soluble organic compound.

14. A process as defined in claim 13 wherein substantially all of the molybdenum in said catalyst is dissolved and oxidized to molybdate in step (b), said aqueous solution formed in step (d) is substantially free of molybdenum and said aqueous solution formed in step (e) is substantially free of vanadium and molybdenum.

15. A process for purifying an aqueous, hydrogen sulfide-scrubbing solution containing a water-soluble transition metal component and a water-soluble organic compound, said scrubbing solution being capable of absorbing hydrogen sulfide and converting the hydrogen sulfide into elemental sulfur, which process comprises:

(a) forming a slurry by mixing said scrubbing solution with (1) particles of a spent solid catalyst containing molybdenum, vanadium and aluminum and (2) a basic aqueous solution;

(b) contacting said slurry with an oxygen-containing gas under conditions such that the molybdenum and vanadium in said catalyst is dissolved and oxidized to molybdate and vanadate while said aluminum remains substantially in the form of a solid residue;

(c) separating the aqueous solution formed in step (b) from said solid residue;

(d) contacting said aqueous solution with hydrogen sulfide under conditions such that the molybdenum in said solution is precipitated, thereby forming an aqueous solution having a reduced concentration of molybdenum;

(e) contacting said aqueous solution having a reduced concentration of molybdenum with a base under conditions such that the vanadium in said solution is precipitated, thereby forming an aqueous solution having a reduced concentration of molybdenum and vanadium; and (f) recovering said aqueous solution having a reduced concentration of molybdenum and vanadium as wastewater which also has a reduced concentration with respect to said slurry formed in step (a) of said water-soluble transition metal component and said water-soluble organic compound originally present in said hydrogen sulfide-scrubbing solution.

16. A process as defined in claim 15 wherein said hydrogen sulfide-scrubbing solution comprises a Hiperion solution in which said water-soluble transition metal component is an iron component and said water-soluble organic compound is a naphthoquinone.

17. A process as defined in claim 15 wherein said basic aqueous solution utilized in step (a) comprises sodium aluminate and said base utilized in step (e) comprises sodium hydroxide.

18. A process as defined by claim 15 wherein the individual concentrations of molybdenum, vanadium, said water-soluble transition metal component and said water-soluble organic compound in said wastewater recovered in step (f) are less than about 10 ppmw.

19. A process as defined by claim 18 wherein the wastewater recovered in step (f) is substantially free of molybdenum, vanadium, said water-soluble transition metal component and said water-soluble organic compound.

20. A process as defined in claim 19 wherein substantially all of the molybdenum and vanadium in said catalyst is dissolved and oxidized to molybdate and vanadate in step (b), said aqueous solution formed in step (d) is substantially free of molybdenum and said aqueous solution formed in step (e) is substantially free of vanadium and molybdenum.

21. A process for purifying an aqueous hydrogen sulfide-scrubbing solution containing a water-soluble vanadium component, a water-soluble organic compound, thiosulfate ions and thiocyanate ions which comprises:
  (a) forming a slurry by mixing said scrubbing solution with (1) particles of a spent solid catalyst containing molybdenum and aluminum and (2) a basic aqueous solution;
  (b) contacting said slurry with an oxygen-containing gas under conditions such that the molybdenum in said catalyst is dissolved and oxidized to molybdate while said aluminum remains substantially in the form of a solid residue;
  (c) separating the aqueous solution formed in step (b) from said solid residue;
  (d) oxidizing any thiocyanate ions remaining in said aqueous solution;
  (e) contacting said aqueous solution with hydrogen sulfide under conditions such that the molybdenum in said solution is precipitated, thereby forming an aqueous solution having a reduced concentration of molybdenum;
  (f) contacting said aqueous solution having a reduced concentration of molybdenum with a base under conditions such that the vanadium in said solution is precipitated, thereby forming an aqueous solution having a reduced concentration of molybdenum and vanadium; and
  (g) recovering said aqueous solution having a reduced concentration of vanadium and molybdenum as wastewater which also has a reduced concentration with respect to said slurry formed in step (a) of said water-soluble organic compound, said thiosulfate ions and said thiocyanate ions.

22. A process as defined by claim 21 wherein said hydrogen sulfide-scrubbing solution comprises a Sulfolin solution in which said water-soluble organic compound is an alkanolamine.

23. A process as defined by claim 21 wherein said hydrogen sulfide-scrubbing solution comprises a Unisulf solution in which said water-soluble organic compound is an aromatic sulfonate, said Unisulf solution further comprises sodium carbonate, sodium bicarbonate, sodium sulfate, sodium citrate and elemental sulfur, and said wastewater recovered in step (g) has a reduced concentration with respect to said slurry formed in step (a) of vanadium, molybdenum, said aromatic sulfonate, sodium thiosulfate, sodium bicarbonate, sodium citrate and elemental sulfur.

24. A process as defined by claim 23 wherein said aromatic sulfonate is selected from the group consisting of sodium anthraquinone disulfonate and sodium phenolsulfonate.

25. A process as defined by claim 21 wherein said thiocyanate ions are oxidized by contacting said aqueous solution with hydrogen peroxide.

26. A process as defined by claim 21 wherein said thiocyanate ions are oxidized by contacting said aqueous solution with nitric or nitrous acid.

27. A process as defined by claim 21 wherein the individual concentrations of vanadium, molybdenum, said water-soluble organic compound, said thiosulfate ions and said thiocyanate ions in said wastewater recovered in step (g) are less than about 10 ppmw.

28. A process as defined by claim 27 wherein the wastewater recovered in step (g) is substantially free of vanadium, molybdenum, said water-soluble organic compound, said thiosulfate ions and said thiocyanate ions.

29. A process as defined in claim 28 wherein substantially all of the molybdenum in said catalyst is dissolved and oxidized to molybdate in step (b), said aqueous solution formed in step (e) is substantially free of molybdenum and said aqueous solution formed in step (f) is substantially free of vanadium and molybdenum.

30. A process for purifying an aqueous hydrogen sulfide-scrubbing solution containing a water-soluble transition metal component and a water-soluble organic compound, said scrubbing solution being capable of absorbing hydrogen sulfide and converting the hydrogen sulfide into elemental sulfur, which process comprises:
  (a) contacting said scrubbing solution with an oxygen-containing gas under conditions such that the water-soluble organic compound in said scrubbing solution is oxidized;
  (b) contacting said oxidized scrubbing solution with a reducing agent under conditions such that said water-soluble transition metal component is reduced;
  (c) contacting the aqueous solution containing said reduced water-soluble transition metal component with a base under conditions such that said water-soluble transition metal component is precipitated, thereby forming an aqueous solution having a reduced concentration of said water-soluble transition metal component; and
  (d) recovering said aqueous solution having a reduced concentration of said water-soluble transition metal component as a wastewater which also has a reduced concentration with respect to said hydrogen sulfide-scrubbing solution of said water-soluble organic compound originally present in said hydrogen sulfide-scrubbing solution.

31. A process as defined by claim 30 wherein said water-soluble transition metal component comprises a vanadium component and said water-soluble organic compound is sodium anthraquinone disulfonate.

32. A process as defined by claim 30 wherein said water-soluble transition metal component comprises a vanadium component and said water-soluble organic compound is diethanolamine.

33. A process as defined by claim 30 wherein said hydrogen sulfide-scrubbing solution further comprises thiocyanate ions and said process further comprises the step of oxidizing said thiocyanate ions with a thiocyanate oxidizing agent following step (a) of said process.

34. A process as defined by claim 30 wherein the individual concentrations of said water-soluble transition metal component and said water-soluble organic compound in said wastewater recovered in step (d) are less than about 10 ppmw.

35. A process as defined by claim 34 wherein the wastewater recovered in step (d) is substantially free of said water-soluble transition metal component and said water-soluble organic compound.

36. A process as defined in claim 35 wherein substantially all of the water-soluble organic compound is oxidized in step (a) and said aqueous solution formed in step (c) is substantially free of said water-soluble transition metal component.

37. A process for purifying an aqueous hydrogen sulfide-scrubbing solution containing a water-soluble iron component and a water-soluble organic compound, said scrubbing solution being capable of absorbing hydrogen sulfide and converting the hydrogen sulfide into elemental sulfur, which process comprises:
    (a) contacting said scrubbing solution with an oxygen-containing gas under conditions such that the water-soluble organic compound in said scrubbing solution is oxidized;
    (b) contacting said oxidized scrubbing solution with a base under conditions such that said water-soluble iron component is precipitated, thereby forming an aqueous solution having a reduced concentration with respect to said oxidized scrubbing solution of said water-soluble iron component; and
    (c) recovering said aqueous solution as a wastewater having a reduced concentration with respect to said hydrogen sulfide-scrubbing solution of said water-soluble iron component and said water-soluble organic compound originally present in said hydrogen sulfide-scrubbing solution.

38. A process as defined in claim 37 wherein said water-soluble organic compound comprises a naphthoquinone.

39. A process for purifying an aqueous hydrogen sulfide-scrubbing solution containing a water-soluble iron component and a water-soluble organic compound, said scrubbing solution being capable of absorbing hydrogen sulfide and converting the hydrogen sulfide into elemental sulfur, which process comprises:
    (a) contacting said scrubbing solution with an oxygen-containing gas under conditions such that the water-soluble organic compound in said scrubbing solution is oxidized;
    (b) contacting said oxidized scrubbing solution with hydrogen sulfide under conditions such that said water-soluble iron component is precipitated, thereby forming an aqueous solution having a reduced concentration with respect to said oxidized scrubbing solution of said water-soluble iron component; and
    (c) recovering said aqueous solution as a wastewater having a reduced concentration with respect to said hydrogen sulfide-scrubbing solution of said water-soluble iron component and said water-soluble organic compound originally present in said hydrogen sulfide-scrubbing solution.

40. A process as defined by claim 39 wherein said water-soluble organic compound comprises a naphthoquinone.

* * * * *

UNITED STATES PATENT AND TRADEMARK OFFICE
CERTIFICATE OF CORRECTION

PATENT NO. : 4,883,601
DATED : November 28, 1989
INVENTOR(S) : Koepke et al.

It is certified that error appears in the above-indentified patent and that said Letters Patent is hereby corrected as shown below:

Column 11, claim 2, line 34, change "sulfide-containing" to
-- sulfide-scrubbing --.

Signed and Sealed this

Twenty-sixth Day of July, 1994

Attest:

BRUCE LEHMAN

Attesting Officer

Commissioner of Patents and Trademarks